Feb. 8, 1966     G. A. ROST ET AL     3,234,117
GALVANIC CELL FOR ANALYZING GAS
Filed Oct. 26, 1962
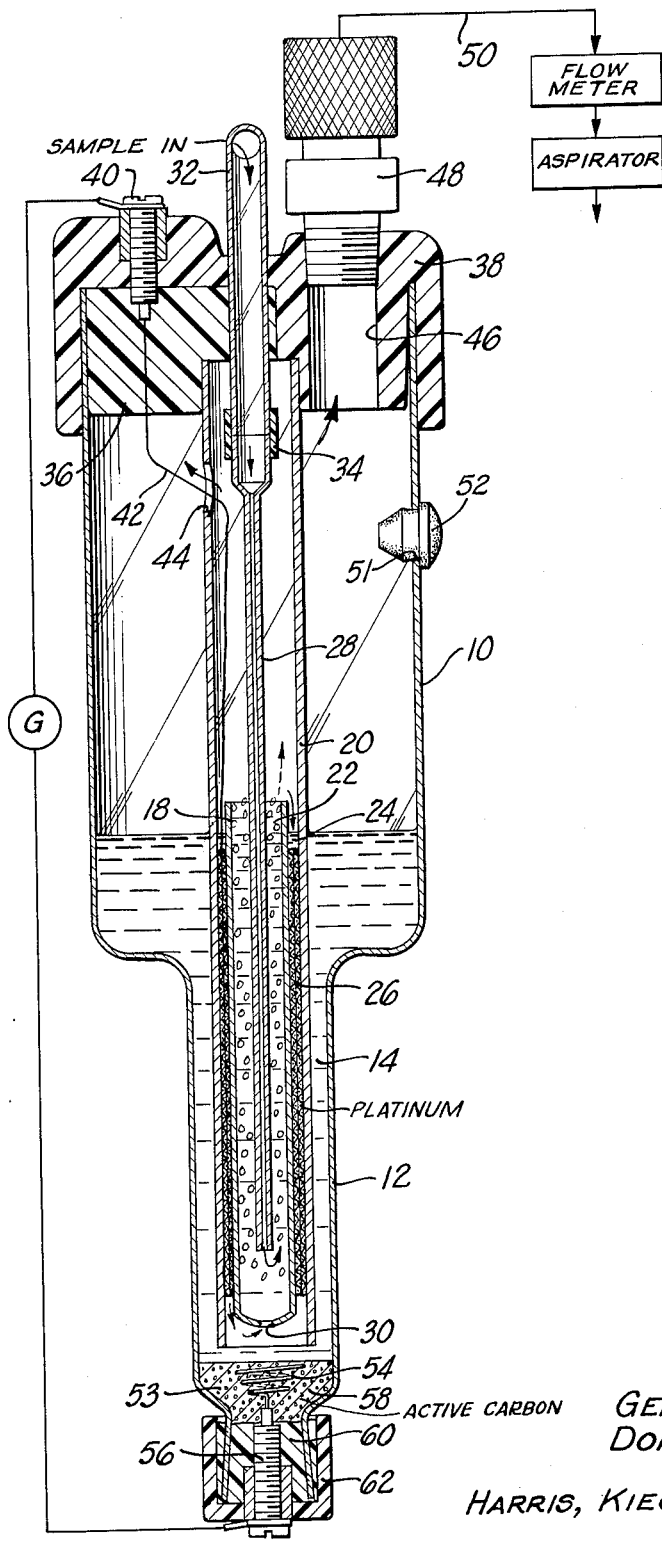
INVENTORS
GERALD A. ROST,
DORIAN J. SWARTZ
BY THEIR ATTORNEYS
HARRIS, KIECH, RUSSELL & KERN

United States Patent Office 3,234,117
Patented Feb. 8, 1966

3,234,117
GALVANIC CELL FOR ANALYZING GAS
Gerald A. Rost, La Habra, and Dorian J. Swartz, Yorba Linda, Calif., assignors to Beckman Instruments, Inc., a corporation of California
Filed Oct. 26, 1962, Ser. No. 233,378
7 Claims. (Cl. 204—195)

This invention relates to gas analysis and, more particularly, to an improved galvanic monitoring apparatus wherein there is a continuous regeneration and recirculation of the electrolyte. The apparatus of the invention is particularly suitable to the determination of ozone and other oxidizing species of a gas stream.

A number of methods are presently known by which ozone is continuously analyzed through liberation of halogen from a halide; for example, iodine from iodide, followed by photometric or amperometric measurement of the halogen.

A commercial ozone monitoring cell now being manufactured makes use of the basic reaction of ozone with potassium iodide of an electrolytic solution to produce free halogen in accordance with the following equation:

(1) $\quad 2KI + O_3 + H_2O \rightarrow 2KOH + I_2 + O_2$

At a platinum cathode of the cell, the free iodine of the electrolyte solution is reduced to iodide, (2) $\quad\quad\quad I_2 + 2e \rightarrow 2I-$ and at a platinum anode the iodine is reformed, (3) $\quad\quad\quad 2I- - 2e \rightarrow I_2$ It will be appreciated that the regeneration of the iodine at the anode forestalls the recirculation of the electrolyte. In the foregoing cell, the problem of preventing the return of the re-formed iodine from the anode to the cathode is acomplished by providing for continuous flow of the electrolyte from cathode to anode, the flow thus acting as a barrier. The volume of electrolytic solution used is reduced to a minimum by flowing a thin film down the surface of a glass rod about which the platinum cathode is wrapped as a fine wire. In the galvanic monitoring cell of this type, it is necessary that a cathodic potential be applied. Ozone picked up by the electrolyte solution produces iodine, which, being cathodically reducible, permits an electric current to flow. Thus, the current measures the rate of arrival of ozone. The electrolyte solution following its contact with the cathode and anode is collected in a liquid trap. The gas stream being monitored is in direct contact with the flowing film throughout its passage through the cell.

The foregoing ozone monitoring cell requires a continuous feeding of solution and it has proven troublesome to maintain the required thin film of electrolyte cascading over the cathode. Another disadvantage of the device is its requirement for an applied voltage and the necessity from time to time to replace the voltage source.

With a recent development described in copending patent application Serial No. 233,357, Hersch, entitled "Improvements in Gas Analysis," filed concurrently herewith and abandoned in favor of continuation-in-part application Serial No. 375,421, filed June 11, 1964, it is no longer necessary to apply an external electromotive force and there is no need for continual or intermittent renewal of the electrolyte. The conversion of the ozone into current is determined solely by Faraday's law and not by the geometry of the cell or by temperature. There is no need for calibration nor for the provision of a standardized source of ozone. The electrolyte is continuously regenerated and may be used indefinitely, thus avoiding a reagent dispensing pump, reagent storage, and a spent electrolyte reservoir. The apparatus of the present invention in its preferred embodiment wherein it is employed for the monitoring of ozone employs the chemical principles disclosed and described in the copending Hersch application.

Broadly speaking, the galvanic cell of the invention comprises a receptacle adapted to hold a body of liquid or electrolyte. An elongated central compartment is provided within the receptacle which compartment is open at its upper and lower ends with its lower end being immersed in the liquid body. An elongated electrode compartment surrounds or encircles the central compartment and is likewise open at its upper and lower ends. The lower end of the electrode compartment is also immersed in the liquid body. A first electrode member which is a platinum cathode in the instance of an ozone monitoring apparatus is disposed within the electrode compartment and is located to contact liquid circulating therethrough. A second electrode member is spaced within the receptacle beneath the lower ends of the central compartment and the electrode compartment. A means is provided for introducing the gas stream being monitored to the lower end of the central compartment in order to induce circulation of the liquid upwardly therethrough and downwardly through the encircling electrode compartment. Where the apparatus of the invention is being used to monitor an ozone-containing stream or the like, the galvanic cell preferably uses an inert conductive material such as platinum for the cathode, an active carbon anode, and a neutral buffered halide solution as the electrolyte. In another form of the apparatus of the invention also suitable for the monitoring of ozone, a silver anode is employed.

In the cell of the invention, the reaction taking place between the ozone of the gas stream being monitored and the bromide or other halide of the electrolyte may be written (4) $\quad\quad O_3 + 2Br- \rightarrow O_2 + O^{--} + Br_2$ The reaction occuring at the platinum cathode with the bromine of the electrolyte may be described as (5) $\quad\quad\quad 2e + Br_2 \rightarrow 2Br-$ Thus, it is seen there is a regeneration of the bromide of the electrolyte which permits the recirculation of the electrolyte for mixing with a further amount of the gas stream monitored. In the ozone monitor now commonly employed, there is an oxidation of the regenerated halide to produce halogen at the anode making the electrolyte unsuitable for recirculation. This does not occur in the active carbon anode-platinum cathode galvanic cell of the invention as at the anode the following reaction occurs:

(6) $\quad\quad ..C + O^{--} \rightarrow ..CO + 2e$ where the ..CO symbol represents an oxygen-chemisorbate. The net effect of reactions (4), (5) and (6) is the oxidation of carbon by one of the oxygen atoms of the ozone molecule. Diatomic oxygen does not interfere though in air it may be ten million times more abundant than ozone. Since the current signal is proportionally related to the rate of supply of ozone by Faraday's constant, temperature changes and cell geometry have no effect, and no calibration with a standardized source of ozone is needed.

The apparatus of the invention may also be used for the determination, continuous or batch-wise, of other species which either produce or consume free halogen and to halogen itself. For example, in a galvanic cell utilizing a bromide electrolyte, chlorine in the gas stream being monitored oxidizes the bromide providing a proportionally like amount of bromine. Bromine itself in the entering sample gas stream would be absorbed into the bromide electrolyte and on circulation to the cathode would be reduced to bromide, providing the desired signal.

The cell of the invention is also applicable to the continuous analysis of reducing species and of olefins in the gas stream being monitored. In such application, the gas stream would be provided with a constant background of ozone or other suitable oxidizing species. The ozone may be generated photochemically, by silent discharge, or by electrolysis. A reducing species carried by the gas stream would depress the level of the ozone and therefore the galvanic output of the cell. A transiently emerging reducing species would generate a negative peak in the recording, of an area stoichiometrically related to the quantity of this species. The cell may thus serve as a selective and highly sensitive detector for gas chromatography. The carrier stream leaving the gas chromatographic column may be made to converge with a stream of ozonized air, and the mixed stream passed into the galvanic cell of the invention. It will be appreciated that the oxidizing species, e.g. ozone, will be added in a constant and larger amount than the anticipated amount of the reducing species. It is also possible to first mix the carrier stream leaving the column with air and to irradiate the reducing species and oxygen together.

In order to obtain a 100% coulometric yield, it is essential that the gas stream contaninging the ozone or other oxidizing species be brought into contact with the halide solution without encountering any metal. The "free halogen" resulting from the reaction of the ozone with the halide is then transported to the cathode. The cathode thus receives only the reaction products of the ozone, not ozone itself, in order that no portion of the ozone be destroyed through a catalytic side reaction. It is now known that ozone may be catalytically decomposed upon direct contact with the platinum cathode to give free oxygen. When this occurs no current results from the event. It is thus necessary that the ozone be dissolved in the electrolyte and employed to oxidize the halide of the electrolyte solution to provide free halogen, which is then reduced back to the halide at the cathode, generating two faradays per mole ozone.

The apparatus of the invention has a special compartment for the dissolution and chemical reaction of the ozone or other oxidizing species, separate from and preceding the cathode and anode compartments. The gas stream which is being monitored provides the pumping action necessary to cycle the electrolyte solution between the dissolution-chemical compartment and the cathode compartment. The dissolution-chemical compartment must provide sufficient interface between the gas stream being monitored and the liquid electrolyte, and there must be sufficient turbulence to insure complete translation of the ozone into free halogen. The cathode must be large enough in area and of proper configuration to catch and convert to halide all the free halogen developed during a single passage of the electrolyte along the cathode surface.

In a preferred embodiment of the galvanic cell of the invention, the foregoing dissolution-chemical compartment takes the form of an elongated compartment of circular cross section which is disposed centrally within the receptacle or cell. An elongated electrode compartment (a cathode compartment in the instance of an ozone monitor) of annular cross section encircles the central compartment. Both the central compartment and the elongated electrode compartment are open at their respective upper and lower ends. The two compartments are substantially immersed in the liquid electrolyte with their upper ends being exposed to the head space of the galvanic cell.

The gas stream being monitored is introduced to the lower end of the central compartment (the dissolution-chemical compartment). In actual practice the central compartment will usually take the form of a narrow tube, into which the gas stream is injected as a jet, forming chains of gas bubbles. During the upward movement of the gas chains, the bubble/solution interface renews itself continuously and turbulently, ensuring an efficient transfer of ozone or other oxidizing material into the electrolyte solution. Once dissolved, the ozone reacts almost instantaneously with the halide. The central compartment is of sufficient length, depending upon the volume of gas and the cross section of the tube, to ensure that at the upper end of the tube where the gas and liquid separate all the ozone has dissolved and reacted. The electrolyte separating from the gas at the upper end of the central compartment flows downwardly through the encircling annular cathode compartment, wherein the platinum cathode in the preferred embodiment is housed. The cathode in its preferred form has an annular cross section similar to that of the compartment itself and possesses an open gauze-like structure. The electrode is of considerable length and is frictionally held lengthwise within the cathode compartment. The electrolyte completely covers the cathode.

In a cell employing a silver anode rather than the carbon anode of the preferred embodiment, the anodic reaction involves the oxidation of silver to silver halide. This does not interfere with the recirculation of the electrolyte.

The anode of the apparatus of the invention may take various forms. In a preferred version, it consists of a platinum wire spiral buried in a bed of active carbon, the platinum wire spiral being incorporated in the structure to improve conductivity. At very high levels of ozone, when the current drain is high, a silver screen anode, employing no carbon, is more suitable. The ability of an active carbon anode to oxidize is limited and the anode may reach this limit early in continuous use if the drain is excessive. A silver anode, for all practical purposes, never gives out. The anode is located in a compartment, disposed below the cathode compartment, away from the main circulating stream of the electrolyte. The electrolyte surrounding the carbon or silver anode has substantially the same composition as the moving part of the electrolyte solution. The cathode and anode are connected to a galvanometer or galvanometer-recorder, or to a resistor with means to measure or record the voltage drop across it developed by the galvanic current.

The foregoing objects, advantages, features and results of the present invention, together with other objects, advantages, features and results thereof which will be apparent to those skilled in the art in light of this disclosure, may be obtained with the exemplary embodiments of the invention described in detail hereinafter and illustrated in the accompanying drawing which shows a longitudinal sectional view of a preferred embodiment of the apparatus of the invention especially suitable for the monitoring of an ozone-containing stream or the like.

The apparatus shown in the drawing comprises a circular glass envelope 10 which centrally of its length is necked-down to provide a leg 12 at its lower end. A pool of electrolyte 14 fills the leg 12 and the lower portion of the enlarged section of the glass envelope 10 above the leg. Two concentrically and vertically disposed glass tubes including a relatively short inner glass tube 18 of a small diameter and a longer outer glass tube 20 define a circular central compartment 22 and a cathode compartment 24 of annular cross section. The central compartment 22 has for its wall the inner tube 18. The concentrically disposed cathode compartment 24 has for its outer wall the outer tube 20 and for its inner wall the inner tube 18. The tubes 18 and 20 between them define the elongated cathode compartment 24 which encircles the central compartment 22.

An elongated platinum cathode 26 having an annular cross section similar to that of compartment 24 itself possesses an open gauze-like structure and is frictionally held within the cathode compartment 24. The platinum cathode is completely immersed in the electrolyte and serves to position the inner tube 18 within the encircling larger diameter outer tube 20.

The gas stream being monitored is introduced to the lower end of the central compartment 22 by a vertically disposed tube 28 of small diameter. The tube 28 lies on the longitudinal axis of the glass envelope 10 and the concentrically disposed tubes 18 and 20. The tube 28 terminates within the central compartment 22 above the lower end of the inner tube 18.

It has been found desirable to partially close off the lower end of the inner tube 18 to provide a port 30 of somewhat reduced diameter. The upper end of the gas introduction tube 28 flares outwardly to provide a section of somewhat greater diameter, which section is held in a glass-to-glass abutting relation to the lower end of a sample inglass conduit 32. A sleeve 34 made of Tygon plastic tubing or tape holds the conduit 32 and tube 28 in their abutting relationship. The upper end of the outer concentric tube 20 is frictionally held within a silicone rubber mass 36 of a hard plastic (for example, phenol-formaldehyde) cap 38. A cathode terminal 40 in the cap 38 is connected by a fine platinum wire 42 to the gauze-like cathode 26. The wire 42 extends downwardly through the silicone mass (in which it is cast), through an oversized lateral opening 44 of the outer concentric tube 20, and thence to the platinum cathode 26. The gas stream being monitored escapes through the lateral opening or port 44 into the head space of the glass envelope 10, and from there leaves the apparatus through a passage 46 in the cap 38 and a coupling 48 to an out-conduit 50 which is connected in series to a flow meter and an aspirator.

The electrolyte may be added to the glass envelope 10 through a port 51 normally blocked by a filling plug 52. The composite cap 38 is conveniently manufactured by placing the hard plastic shell proper within a jig, with the plastic shell facing upward and with the glass conduit 32 disposed therein. The silicone mass is poured as a liquid into the cavity of the cap to enclose the conduit 32 and the platinum wire 42. The hole in which the upper end of the outer concentric tube 20 is eventually placed is purposely made undersize in order to provide a tight frictional fit for that tube upon assembly of the device. A plastic soft epoxy material may be used in the place of the silicone rubber.

The anode compartment 53 of the apparatus is disposed at the lower end of the leg 12 of the glass envelope 10. In the particular embodiment illustrated, a small piece of platinum wire 54 which is loosely spiralled is placed within the anode compartment and is attached to an anode terminal 56. The platinum wire is used to improve conductivity. A paste 58 of active carbon made by working the carbon into the electrolyte fills the anode compartment, with the platinum spiral wire 54 buried therein. The terminal end of the leg 12 which is of reduced diameter is buried within an epoxy resin mass 60 contained in a hard plastic (for example, phenol-formaldehyde) cap 62. The cathode terminal 40 and anode terminal 56 are connected to a suitable measuring means such as a glavanometer as illustrated.

In the use of the apparatus, the gas stream being monitored enters through the conduit 32 and glass tube 28 and is discharged into the electrolyte contained within the central compartment 22. The gas stream is ejected as a jet and forms chains of gas bubbles which rise upwardly thorugh the electrolyte of the central compartment 22. During the upward movement of the gas bubbles, ozone or other oxidizing species transfers to the electrolyte solution where the ozone reacts almost instantaneously with the halide. By the time the gas bubbles have reached the upper end of the central compartment 22 all of the ozone has dissolved and reacted. The gas bubbles separate from the liquid and continue into the head space of the upper portion of the outer tube 20, leaving the tube by port 44 and eventually being exhausted from the apparatus through passage 46 and the out-canduit 50. The structure of the galvanic cell of the invention may be incorporated in other galvanic cells where the chemistry permits.

After separating the gas stream from the electrolyte solution, the solution descends along the length of the platinum cathode 26 within the annular compartment 24. From the bottom of the cathode compartment 24, the electrolyte returns through port 30 to the central compartment 22, wherein it is recycled by the gas lift provided by the incoming gas stream.

There is, with passage of time, some evaporation of water from the electrolyte solution, but this does not become an immediate pressing problem because of the large electrolyte reservoir provided by the envelope 10 outside of the two concentric tubes 18 and 20.

The preferred electrolyte composition employs a mixture of bromide with a trace of iodide. The trace amount of iodide is a most important feature. With an electrolyte having only bromide present, the reaction with ozone in the bubble chain of the inner gas lift tube is normally not fast enough to prevent some ozone from reaching the platium in the case of a moderately sized gas lift tube. With a high concentration of iodide present and in the absence of bromide, the yield is high, owing to the larger driving force which causes the ozone to oxidize iodide, as compared with bromide. However, at high iodide levels, the side reaction of iodide with oxygen becomes noticeable, causing a high background. At low iodide levels, the yield may be below the theoretical maximum. It has been discovered that a trace of iodide with an appreciable concentration of bromide gives the best results. The iodide salt is preferably present in an amount of 0.0005 to 0.002 mol/liter with 1–5 mol/liter of the bromide salt. It was also discovered that a trace of iodide (for example, 0.001 M per liter) without bromide but in presences of a high concentration (1 to 5 M) of chloride or nitrate, also gives fast response and a high coulombic yield. In the case of the nitrate addition, the role of the intermediary halogen is played entirely by the trace of iodide. Nitrate presumably assists by imparting to the solution a high ionic strength. Other inert salts, such as sulfates, may be used to give the solution ionic strength.

If the electrolyte is allowed to become alkaline, the yield decreases. It is therefore desirable to buffer off the local alkalinity which would otherwise develop at the platinum cathode and which would raise the pH of the circulating portion of the electrolyte. The pH should be kept around the neutrality point and to this end buffering salts are incorporated in the electrolyte. A low pH would cause the cell to be noticeably responsive to nitrogen dioxide.

This apparatus is desirably made from borosilicate-type glass. It is important that all parts of the sampling ducts be clean. Preferably, they should be made of smooth glass. Where junctions are unavoidable, they should be formed of glass abutting to glass, with Tygon sleeves. Teflon ducts are found to destroy ozone when new. It is also important that the electrolyte, prior to arriving at the cathode, should not have contact with any material absorbing or adsorbing the iodine or other halogen, or reacting with it. Metal, rubber, Tygon, and ground glass surfaces should be avoided wherever possible in those parts of the apparatus which carry free halogen, which parts should preferably be made entirely of smooth glass.

Although exemplary embodiments of the invention have been disclosed herein for purposes of illustration, it will be understood that various changes, modifications, and substitutions may be incorporated in such embodiments without departing from the spirit of the invention as defined by the claims which follow.

What is claimed is:

1. In a galvanic cell for monitoring a gas stream employing an electrolyte, the improvement comprising:
    two concentrically substantially vertically disposed tubes, the inner one of said tubes having openings at its upper and lower ends and defining a central compartment with the space between said two tubes providing an annular electrode compartment, and said outer one of said tubes having an opening at its upper end for venting undissolved gases;
    a first electrode within said annular electrode compartment;
    a second electrode spaced beneath said first electrode and said inner one of said tubes;
    conduit means extending into said central compartment and terminating adjacent to the lower end thereof for introducing the gas stream being monitored into the cell and for inducing circulation of electrolyte upwardly through said central compartment, downwardly through said annular electrode compartment and back to said central compartment; and
    means for connecting the two electrodes to a current measuring means.

2. In a glavanic cell for monitoring a gas stream employing an electrolyte, the improvement comprising:
    two concentrically and substantially vertically disposed tubes, the inner one of said tubes having openings at its upper and lower ends and defining a central compartment with the space between said two tubes providing an annular electrode compartment, said outer one of said tubes having an opening at its upper end for venting undissolved gases;
    a first electrode formed of an inert conductive material disposed within said annular electrode compartment;
    a second electrode selected from the group consisting of silver and active carbon spaced beneath said first electrode and said inner one of said tube;
    conduit means extending into said central compartment and terminating adjacent to the lower end thereof for introducing the gas stream being monitored into the cell and for inducing circulation of electrolyte upwardly through said central compartment, downwardly through said annular electrode compartment and back to said central compartment; and
    means for monitoring the two electodes to a current measuring means.

3. In a galvanic cell adapted to the monitoring of a gas stream, a combination comprising:
    a receptacle adapted to hold a body of liquid;
    an elongated central compartment within the receptacle open at its upper and lower ends with its lower end being adapted to be immersed in the liquid body;
    an elongated electrode compartment surrounding said central compartment and opening at its upper and lower ends, said lower end of the electrode compartment being adapted to be immersed in the liquid body;
    a first electrode member formed of an inert conductive material disposed within the electrode compartment and located to contact liquid circulating therethrough;
    a second electrode member formed of active carbon located within the receptacle and spaced beneath the lower ends of the central and electrode compartments;
    conduit means extending into said central compartment and terminating adjacent to the lower end thereof for introducing the gas stream being monitored into the cell and for inducing circulation of electrolyte upwardly through said central compartment, downwardly through said electrode compartment and back to said central compartment; and
    means for connecting the two electrode members to a current measuring means.

4. In a galvanic cell adapted to the monitoring of a gas stream, the combination comprising:
    a receptacle adapted to hold a body of liquid;
    an elongated central compartment within the receptacle open at its upper and lower ends with its lower end being adapted to be immersed in the liquid body;
    an elongated electrode compartment surrounding said central compartment and open at its upper and lower ends, said lower ends of the electrode compartment being adapted to be immersed in the liquid body;
    a first electrode member disposed within the electrode compartment and located to contact liquid circulating therethrough;
    a second electrode member located within the receptacle and spaced beneath the lower ends of the central and electrode compartments;
    conduit means extending into said central compartment and terminating adjacent to the lower end thereof for introducing the gas stream being monitored into the cell and for inducing circulation of electrolyte upwardly through said central compartment, downwardly through said electrode compartment and back to said central compartment; and
    means for connecting the two electrode members to a current measuring means.

5. A galvanic cell in accordance with claim 4 wherein the first electrode member has an annular cross section and possesses an open gauze-like structure, said first electrode member being elongated and extending lengthwise of the electrode compartment.

6. A galvanic cell in accordance with claim 4 wherein said conduit means for introducing the gas stream being monitored comprises an elongated conduit disposed along the elongated axis of the central compartment with its lower end terminating above the lower end of said central compartment.

7. In a galvanic cell adopted to the monitoring of a gas stream, the combination comprising:
    a receptacle adapted to hold a liquid body;
    an elongated central compartment of circular cross section disposed within the receptacle, said central compartment being open at its upper and lower ends with its lower end being adapted to be immersed in the liquid body;
    an elongated cathode compartment of annular cross section encircling said central compartment, said cathode compartment being open at its upper and lower ends with its lower end being adapted to be immersed in the liquid body;
    a cathode of porous structure and formed of inert conductive material disposed within the cathode compartment and substantially completely filling said annular cathode compartment;
    an anode located within the receptacle and spaced beneath the lower ends of the central and cathode compartments, said anode being made of a material selected from the group consisting of active carbon and silver;
    conduit means extending into said central compartment and terminating adjacent to the lower end thereof for introducing the gas stream being monitored into the cell and for inducing circulation of electrolyte upwardly through said central compartment, downwardly through said elongated cathode compartment and back to said central compartment; and means for connecting the cathode and anode to a current measuring means.

References Cited by the Examiner

UNITED STATES PATENTS

| | | | |
|---|---|---|---|
| 2,414,411 | 1/1947 | Marks | 204—195 |
| 2,651,612 | 9/1953 | Haller | 204—195 |
| 2,745,804 | 5/1956 | Shaffer | 204—195 |
| 2,805,191 | 9/1957 | Hersch | 204—195 |
| 3,028,317 | 4/1962 | Wilson et al. | 204—195 |
| 3,081,250 | 3/1963 | Hall et al. | |

FOREIGN PATENTS 1,219,596  12/1959  France.

JOHN H. MACK, *Primary Examiner.*

MURRAY TILLMAN, WINSTON A. DOUGLAS, *Examiners.*